(12) United States Patent
Imamura et al.

(10) Patent No.: US 7,120,099 B2
(45) Date of Patent: Oct. 10, 2006

(54) LASER OUTPUT CIRCUIT FOR OPTICAL DISK RECORDING APPARATUS

(75) Inventors: Yutaka Imamura, Gunma (JP); Toshihiko Hiroshima, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 443 days.

(21) Appl. No.: 10/040,177

(22) Filed: Nov. 6, 2001

(65) Prior Publication Data

US 2002/0057635 A1 May 16, 2002

(30) Foreign Application Priority Data

Nov. 15, 2000  (JP) .............................. 2000-348300

(51) Int. Cl.
*G11B 5/09* (2006.01)
*G11B 7/125* (2006.01)

(52) U.S. Cl. .................................. 369/47.53

(58) Field of Classification Search ............. 369/47.51, 369/47.53

See application file for complete search history.

(56) References Cited

U.S. PATENT DOCUMENTS

| | | | | |
|---|---|---|---|---|
| 4,788,672 A | * | 11/1988 | Toyooka et al. | 369/30.09 |
| 5,305,297 A | * | 4/1994 | Nishiuchi et al. | 369/116 |
| 5,309,419 A | * | 5/1994 | Koike | 369/47.53 |
| 5,321,679 A | * | 6/1994 | Horiguchi | 369/53.37 |
| 5,592,463 A | * | 1/1997 | Muramatsu et al. | 369/47.53 |
| 5,663,941 A | * | 9/1997 | Aoshima | 369/44.34 |
| 6,052,347 A | * | 4/2000 | Miyata | 369/47.53 |
| 6,061,316 A | | 5/2000 | Nakamura et al. | |
| 6,115,338 A | | 9/2000 | Masaki et al. | |
| 6,134,209 A | * | 10/2000 | Den Boef | 369/47.53 |
| 6,404,712 B1 | * | 6/2002 | Lee et al. | 369/47.53 |
| 6,618,334 B1 | * | 9/2003 | Yamamoto | 369/47.51 |
| 6,646,965 B1 | * | 11/2003 | Kim | 369/47.53 |
| 2002/0003760 A1 | * | 1/2002 | Honda | 369/47.52 |

FOREIGN PATENT DOCUMENTS

| | | |
|---|---|---|
| EP | 0 642 122 | 3/1995 |
| EP | 0 905 685 | 3/1999 |
| JP | 58164059 A * | 9/1983 |
| JP | 6-076288 | 3/1994 |

* cited by examiner

*Primary Examiner*—Brian E. Miller
*Assistant Examiner*—Peter Vincent Agustin
(74) *Attorney, Agent, or Firm*—Hogan & Hartson LLP

(57) ABSTRACT

A disk divided into a trial writing region, buffer region, read-in region, program region, and read-out region disposed from an inner peripheral side toward an outer peripheral side is rotated at a constant angular speed. A test signal is recorded in the trial writing region and an outer peripheral region disposed outside the read-out region, the recorded test signals are read, and a laser output value is set based on the reproduced test signals of the two regions.

4 Claims, 2 Drawing Sheets

LASER OUTPUT CIRCUIT FOR OPTICAL DISK RECORDING APPARATUS

BACKGROUND OF THE INVENTION i) Field of the Invention

The present invention relates to an optical disk recording/reproducing apparatus constituted for recording of a signal on a disk using a laser emitted from an optical pickup and for reading of a signal recorded on the disk.

ii) Description of Related Art

Disk players having an optical pickup for reading signals recorded on a disk have become common items, and in recent years optical disk recording/reproducing apparatuses having a constitution providing them with, in addition to signal reproduction capability, a capability of recording a signal on a disk using laser light emitted from the optical pickup have also become commercially available.

Such optical disk recording/reproducing apparatuses use a laser to form a pit on a recording disk. However, in such devices, when laser output is not optimum, the formed pit will be too large or too small. Therefore, a trial writing region is disposed along the inner periphery of disks for use with such optical disk recording/reproducing apparatuses. In such systems, a signal is first recorded in the trial writing region and then retrieved. The reproduced signal is analyzed, and this information is used to set the laser output for recording. Such a technique is disclosed in, for example, Japanese Patent Laid-Open No. Hei 6-76288.

For an operation for recording a signal into a disk, a linear speed is not a defined constant. A technique has been developed in which the recording operation can be performed at constant linear speeds such as four, six, eight, ten, and twelve times the defined linear speed. When the recording operation is performed at a constant linear speed, accurate rotation speed control operation by a spindle motor for rotating/driving the disk must be maintained. As a result, it is difficult to perform recording operations at higher linear speeds.

As a technique for addressing this problem, a technique has been developed in which the rotation speed control operation of the disk during the recording operation is performed at a constant angular speed rather than at a constant linear speed. However, because the linear speed of a disk rotated at a constant angular speed varies widely between the inner and outer peripheries, a difficulty remains in that it is difficult to set the laser output suitable for the recording operation at each speed.

SUMMARY OF THE INVENTION

An object of the present invention is to provide a laser output setting method solving the problems described above.

According to the present invention, there is provided an optical disk recording apparatus for recording a signal on a disk rotating at a constant angular speed wherein a test signal is recorded onto a trial writing region on an inner peripheral side and an outer peripheral region disposed in the outside, and the recorded test signals are read out and used for setting a laser output value. Appropriate laser output values can be set for recording a signal onto a disk rotated or driven at a constant angular speed.

It is preferable to set a laser output value between the inner peripheral side and the outer peripheral side based on the laser output value set in the trial writing region disposed on the inner peripheral side and the laser output value set in the outer peripheral region on the outer peripheral side. Thereby, the laser output value can be set to an optimum value at every position of the disk.

According to one aspect of the present invention, a recording property of the disk is distinguished, and the laser output value between the inner peripheral side and the outer peripheral side is set based on the laser output value set in the trial writing region, the laser output value set in the outer peripheral region, and the distinguished recording property of the disk, so that the setting operation of an accurate laser output value can be performed in each recording position.

Because a distinguishing operation of the recording property of the disk is performed by a recording/reproducing operation of the test signal in the trial writing region, it is possible to more accurately set laser output values.

Additionally, in the present invention, the distinguishing operation of the recording property of the disk may be performed using data recorded on the disk, enabling faster and yet more accurately setting of the laser output value.

Moreover, in the present invention, the laser output value set in the trial writing region and the laser output value set in the outer peripheral region may be stored until the disk is changed. Therefore it is unnecessary to repeat the setting operation of the laser output each time the recording operation is interrupted. Convenience of the device is thereby enhanced.

Furthermore, the laser output value set in the trial writing region and the laser output value set in the outer peripheral region may be deleted when a predetermined time elapses after the end of a recording operation. This measure can prevent the recording operation of the signal from being performed in a non-optimum laser output value resulting from changes in the recording properties of the disk over time.

DETAILED DESCRIPTION OF THE PREFERRED EMBODIMENT

Figure 1:
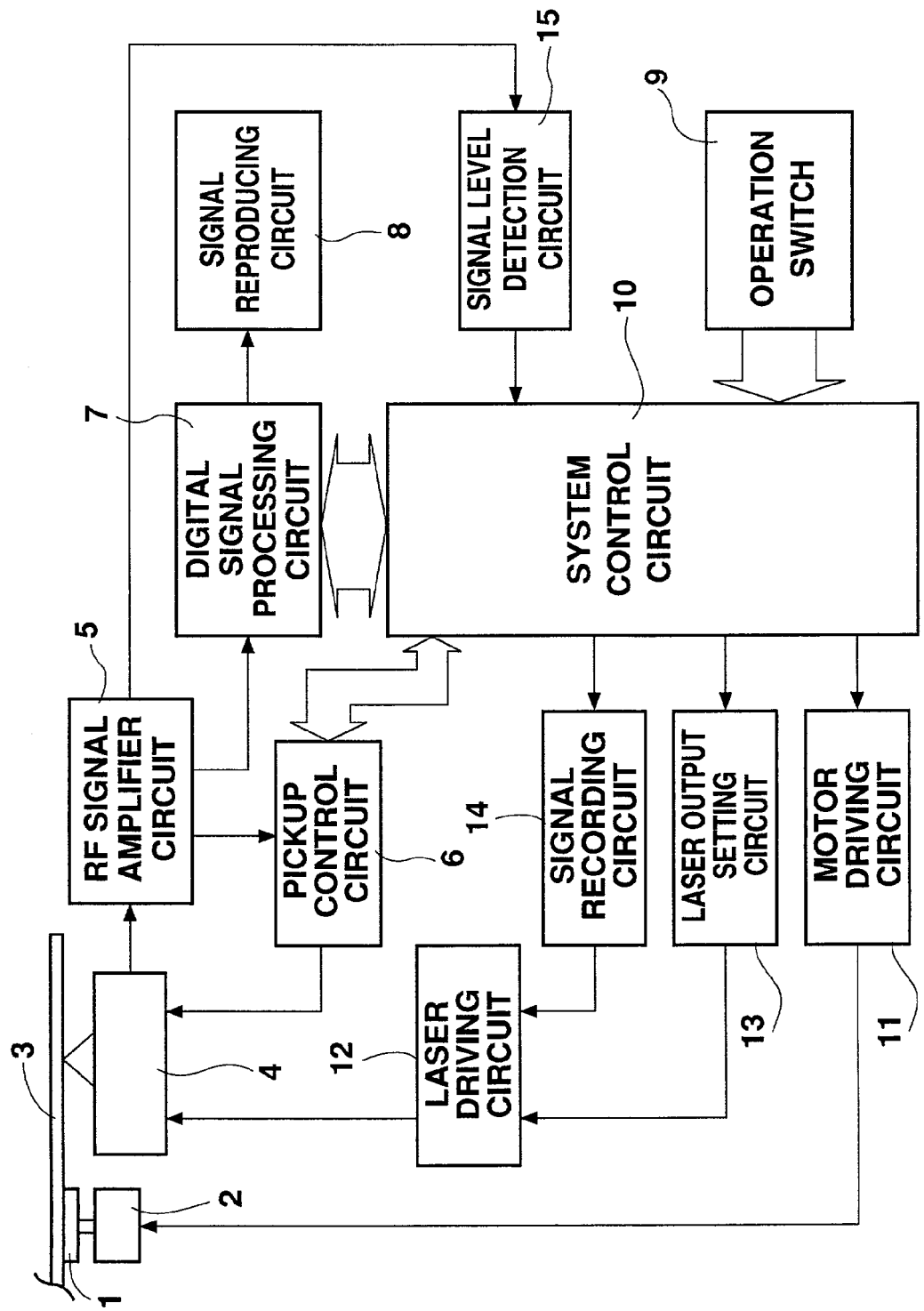
FIG. 1 is a block circuit diagram for one embodiment of the present invention.
Figure 2:
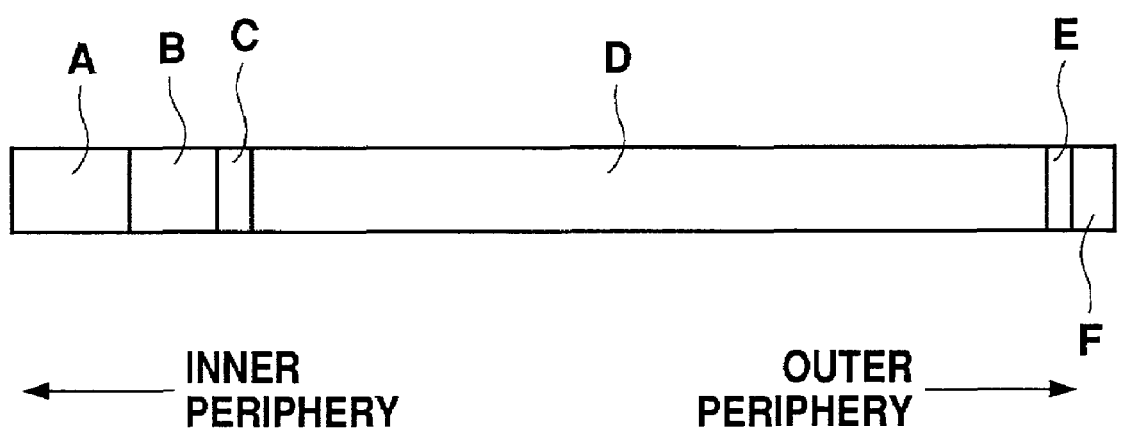
FIG. 2 is an explanatory view of regions of a disk employed with the present invention.

FIG. 1 is a block circuit diagram showing a preferred embodiment of an optical disk recording/reproducing apparatus according to the present invention, and FIG. 2 is an explanatory view of each region of a disk as used with the present invention.

First, each region illustrated in FIG. 2 will be described. In FIG. 2, a trial writing region A for recording a test signal and for reproducing the recorded test signal to set a laser output is disposed at the inner periphery of the disk. A buffer region B for recording information indicating a recording position during a recording operation of the signal is disposed at the outer periphery of the disk. A read-in region C in which TOC data is recorded, a program region D in which the signal is recorded, and a read-out region E indicating an outermost periphery of a recording region are disposed towards the outer periphery of the buffer region B.

The respective regions of the disk are disposed as described above. Constitution of the apparatus will next be described with reference to the block circuit diagram shown in FIG. 1. In FIG. 1, a turntable 1 on which is mounted a disk 3 is rotated or driven by a motor 2. An optical pickup 4 includes a laser element for irradiating the disk 3 with a light beam and an optical detector for receiving light reflected from a signal surface of the disk 3. The optical pickup 4 is configured such that it can be moved in a direction diametric to the disk 3 through a rotating operation of a pickup driving motor, not shown.

A reference numeral 5 denotes an RF signal amplifier circuit for amplifying an RF signal obtained from the optical detector incorporated in the optical pickup 4 and shaping a waveform. Numeral 6 denotes a pickup control circuit for performing a focusing control operation for focusing the light beam emitted from the optical pickup 4 on the signal surface of the disk 3 based on a signal obtained via the RF signal amplifier circuit 5; a tracking control operation for causing the light beam to follow a signal track of the signal surface; and a control operation of a track jump operation for moving the light beam to an adjacent track or the like.

A reference numeral 7 denotes a digital signal processing circuit for performing digital signal processing of the signal output from the RF signal amplifier circuit 5, and a demodulation operation for each type of signal. Numeral 8 denotes a signal reproducing circuit to which a digital signal obtained by processing the signal in the digital signal processing circuit 7 is input. When information recorded in the disk 3 is an audio signal, the signal reproducing circuit converts the digital signal to an analog signal, and outputs the analog signal to an amplifier. When the information is a data signal such as computer software, the digital signal is output to a computer apparatus.

A reference numeral 9 denotes an operation switch including switches for respective operations, operated to switch the operation of the optical disk recording/reproducing apparatus. Numeral 10 denotes a system control circuit to which the signal demodulated by the digital signal processing circuit 7 is input, and which performs various control operations in response to the operation of the operation switch 9. The system control circuit includes a memory circuit (not shown) for storing a laser output value or the like, as described below. Numeral 11 denotes a motor driving circuit whose operation is controlled by the system control circuit 10 and which has a function for rotating, driving, or controlling the motor 2 at a constant angular speed.

Reference numeral 12 denotes a laser driving circuit for driving the laser element incorporated in the optical pickup 4, and 13 denotes a laser output setting circuit whose operation is controlled by the system control circuit 10. The laser output setting circuit is constituted to control the laser driving circuit 12 and to thereby set laser output. Numeral 14 denotes a signal recording circuit to which a recording signal is input and which controls laser emission operation of the laser driving circuit 12 in response to the signal to record the signal into the disk 3. Numeral 15 denotes a signal level detection circuit to which the signal output from the RF signal amplifier circuit 5 is input, which detects a level of the signal, and the detection output of which is input to the system control circuit 10.

In the circuit, when the disk 3 is inserted into a disk mounting facility of the optical disk recording/reproducing apparatus in order to perform a recording operation of the signal, a laser output setting operation is performed. The laser output setting operation is performed by a recording operation of the test signal onto the trial writing region A disposed on the innermost peripheral side of the disk 3 and reproducing operation of the recorded test signal, and a recording operation of the test signal onto an outer peripheral region F disposed outside the read-out region E and reproducing operation of the recorded test signal. The operation is described in detail below.

The laser output is set after the recording/reproducing operation of the test signal onto the trial writing region A and outer peripheral region F, and a recording operation of the signal onto the program region D of the disk is begun according to the set laser output. During the signal recording operation, changes in the light reflected by the disk 3 are monitored, and the value of the driving current supplied to the laser element from the laser driving circuit 12 is adjusted accordingly to thereby the laser output so as to maintain an optimum output for recording.

The optical disk recording/reproducing apparatus according to the present invention can be configured as described above. Next, a signal reproduction operation by the circuit configured as described above will be described. When an operation switch for reproduction disposed in the operation switch 9 is operated, a control operation for the reproducing operation by the system control circuit 10 is started. When the reproducing operation is performed, the driving current with the laser output for performing a reading operation of the signal obtained therefrom is supplied to the laser element incorporated in the optical pickup 4 from the laser driving circuit 12.

When the control operation for the reproducing operation is started, a rotation control operation of the motor 2 is performed by the motor driving circuit 11. Moreover, focus and tracking control operations of the optical pickup 4 are started, as is the reading operation of the signal from the disk 3 by the optical pickup 4. The rotating operation of the disk 3 during the reproducing operation is performed at a constant angular speed.

The signal read by the optical pickup 4 is input to the digital signal processing circuit 7 through the RF signal amplifier circuit 5, and the demodulation operation of the signal is performed. This signal processing operation is performed in accordance with a linear speed at a reading position of the signal. When the digital signal processing circuit 7 performs the signal processing and information data is extracted, the information data is subjected to signal processing such as error correction, and output to the signal reproducing circuit 8.

Moreover, when the information data read from the disk 3 is an audio signal, the signal reproducing circuit 8 converts the audio signal to an analog signal, and outputs the analog signal to an amplifier or the like. When the data is a data signal such as computer software code, the raw digital signal is output to a computer.

The reproducing operation in the present embodiment is performed as described above. A signal recording operation will next be described. When the disk 3 for recording the signal is inserted into the disk mounting portion of the optical disk recording/reproducing apparatus, the laser output value is set based on the results of the recording/reproducing operation of the test signal onto the trial writing region A and outer peripheral region F as described below.

The recording operation of the signal input from the signal recording circuit 14 is started after the laser output value has been set in consideration of the test signal reproduced from the test signal recorded onto the trial writing region A and outer peripheral region F. The recording operation of the signal is performed with respect to the program region D disposed in the disk 3, but the disk 3 is constituted to be rotated or driven at a the constant angular speed.

When the recording operation is performed, temperature of the optical pickup 4 changes. Therefore, the laser output and laser wavelength change, and a recording property with respect to the disk 3 changes. That is, although the setting of the laser output value is not changed, the shape formed pits changes, and the signal level of the read signal also changes. When the recording property with respect to the disk 3 changes, the light reflected by the disk surface changes. When this is detected, the laser output value set by the laser output setting circuit 13 is adjusted to compensate for the change. As a result, the recording operation of the signal onto the disk 3 can be continued while an optimum laser output value is maintained.

Moreover, when the recording operation of the signal is canceled by operating a recording stop switch disposed in the operation switch 9, the recording operation is completed by recording into the buffer region B and read-in region C position information data indicating the recording position of the signal. The position information data can be utilized to start the reproducing operation of a desired signal, or to perform a setting operation of a position for starting the next recording operation.

The recording operation of the signal is performed as described above. A method of setting the laser output in the present invention will next be described. The laser output setting operation is started when the recording disk is provided to the disk mounting portion. The setting operation of the laser output is performed by changing the laser output in a continuous or stepwise manner, recording the test signal in the trial writing region A and outer peripheral region F, performing the reproducing operation of the recorded test signal, detecting an optimum test signal from among the reproduced test signals, and setting laser output corresponding to the detected optimum signal.

The laser output setting operation for the trial writing region A and the outer peripheral region F is performed as described above. Moreover, the setting operation of the laser output is performed in a state in which the disk 3 is rotated, driven, or controlled at a constant angular speed according to a rotation speed for actually performing the recording operation.

The test signal is recorded in the trial writing region A of the disk 3 in a driven state at the rotation speed by changing the laser output in the continuous or stepwise manner. Moreover, the recorded signal is reproduced, and the test signal generated in an optimum state is detected from the reproduced test signals. Furthermore, the laser output value corresponding to the reproduced signal detected as an optimum signal is set as an optimum laser output value on the inner peripheral side. The laser output value set in this manner is stored in the memory circuit incorporated in the system control circuit 10 as the laser output value for the inner peripheral side.

After completion of the setting operation of the laser output with respect to the inner peripheral side as the object, the optical pickup 4 is moved to the outer peripheral side, the test signal is recorded in the outer peripheral region F of the disk 3 by changing the laser output in a continuous or stepwise manner, the recorded signal is reproduced, and the test signal reproduced in the optimum state is detected from the reproduced test signals, all while maintaining the rotation speed of the disk 3. Moreover, the laser output value corresponding to the reproduction signal detected as the optimum signal is set as the optimum laser output value on the outer peripheral side. The laser output value set in this manner is stored in the memory circuit incorporated in the system control circuit 10 as the laser output value on the outer peripheral side.

The laser output value set as the optimum value on the inner peripheral side and the laser output value set as the optimum value on the outer peripheral side are stored in the memory circuit incorporated in the system control circuit 10 as described above. The laser output values in positions on the inner and outer peripheral sides on the disk 3 are set and stored in the memory circuit. Therefore, the laser output value between the inner peripheral side and the outer peripheral side can be calculated based on the output values stored in the memory circuit. Moreover, between the inner peripheral side and the outer peripheral side, the laser output value is calculated based upon a change property of the laser output preset in accordance with the property of the disk 3.

The laser output value is set as described above. Therefore, even when the recording operation is performed in the constant angular speed state of the rotation operation of the disk 3, that is, even when the linear speed is accelerated with a change of the recording position to the outer peripheral side from the inner peripheral side, the recording operation of the signal can be performed at a laser output value optimum for the speed at the recording position.

The laser output value is set corresponding to each position of the program region D disposed in the disk 3, but the detection operation of each position can be performed based on the position information data recorded by a wobble disposed in the disk 3. Moreover, when the position of the optical pickup 4 is mechanically detected, each position of the disk 3 is detected, and the laser output value can be set in accordance with the position.

Once the laser output value of the inner peripheral side and the laser output value of the outer peripheral side are set, a laser output value suitable for each position of the program region D can be determined based on these values. The laser output value in the program region D can be linearly interpolated between the inner laser output value and the outer laser output value and determined. However, a more appropriate laser output value can be obtained when the laser output value in the program region D is determined according to a calculation equation preset in consideration of the recording properties of the disk.

Furthermore, disk recording properties differs from disk to disk. In the present invention, the recording property indicates a relation of the signal level of the read data to the laser output value, and also includes the change to the outer peripheral side from the inner peripheral side. Here, the test data is stored while the laser output value is changed in a predetermined range as described above. Moreover, when the laser output value is different, the formed pit shape differs, and the read signal level differs. Therefore, the recording properties of a particular disk, being the relationship between the laser output value and the read signal level (pit shape), can be known based on the signal level of the test data. When the recording property is considered, a more appropriate specific laser output value can be set.

Furthermore, the recording properties of disks are influenced by their manufacturing process. In disks produced by some manufacturers information to identify the manufacturer, disk type, recording properties, or the like is stored on the disk. When such disks are used, and the laser output value can preferably be set based on recording property and other information read from the disk.

The setting operation of the laser output is performed as described above. However, when a new disk 3 is inserted, an operation for deleting the data indicating the laser output value stored in the memory circuit is performed. That is, the data is normally stored until the disk is changed. Therefore, it is advantageously unnecessary to repeat the laser output setting operation for a disk when recording operation is resumed after interruption.

However, even when the same disk is used, the recording properties of the disk may change but when the recording operation is not performed for a long time. Therefore, the deleting operation of the laser output value stored in the memory circuit may be performed after the elapse of a predetermined time after the end of the recording operation. When a deleting operation is performed in this manner, a message indicating that the setting operation of the laser output must be performed before restart of the next recording operation may be preferably displayed.

What is claimed is:

1. A laser output circuit for an optical disk recording apparatus in which an optical disk is rotated at a constant angular speed and a signal is recorded while the disk is rotated, said laser output circuit comprising:
   a pickup control circuit for controlling a pickup position at which data is written onto the optical disk;
   a signal recording circuit for supplying to said pickup data to be written onto said optical disk;
   a signal level detection circuit for detecting a signal level of the signal read by said pickup; and
   a laser output setting circuit for setting a laser output for the writing of data onto the optical disk by said pickup,
   wherein test data is written onto a trial writing region on an inner peripheral side of said optical disk and onto an outer peripheral region outside a data writing region, the thus written test data is read from the disk, and said laser output is set in accordance with the signal levels of the test data read from both the trial writing region and the outer peripheral region;
   wherein said trial writing region, a buffer region, a lead-in region, a program region, and a lead-out region are disposed in order from the inner peripheral side of said optical disk toward the outer peripheral side, and said outer peripheral region is disposed outside the lead-out region;
   wherein test data is written onto or read from the trial writing region disposed on an inner peripheral side of said optical disk and the outer peripheral region disposed outside of the lead-out region;
   wherein an inner peripheral side laser output set from the test data read from the trial writing region, and an outer peripheral side laser output set from the test data read from the outer peripheral region are stored in a memory;
   wherein the inner peripheral side laser output set according to the test data read from the trial writing region and the outer peripheral side laser output set according to the test data read from the outer peripheral region are deleted from the memory when the disk is replaced; and
   wherein the inner peripheral side laser output set according to the test data read from the trial writing region and the outer peripheral side laser output set according to the test data read from the outer peripheral region are deleted from the memory when a predetermined time elapses after the end of a recording operation.

2. The circuit according to claim 1 wherein said laser output setting circuit sets the laser output based on an inner peripheral side laser output set according to the test data read from the trial writing region, an outer peripheral side laser output set according to the test data read from the outer peripheral region, and information on a recording property of the disk.

3. The circuit according to claim 2 wherein said test data is written by altering the laser output within a predetermined range, and said recording property is determined from the test data based on a relationship between the laser output and the signal level of the signal read by said pickup.

4. The circuit according to claim 2 wherein prerecorded data regarding a recording property of the disk is read from the disk, and said recording property is determined based on the read data.

* * * * *